Figure 1:
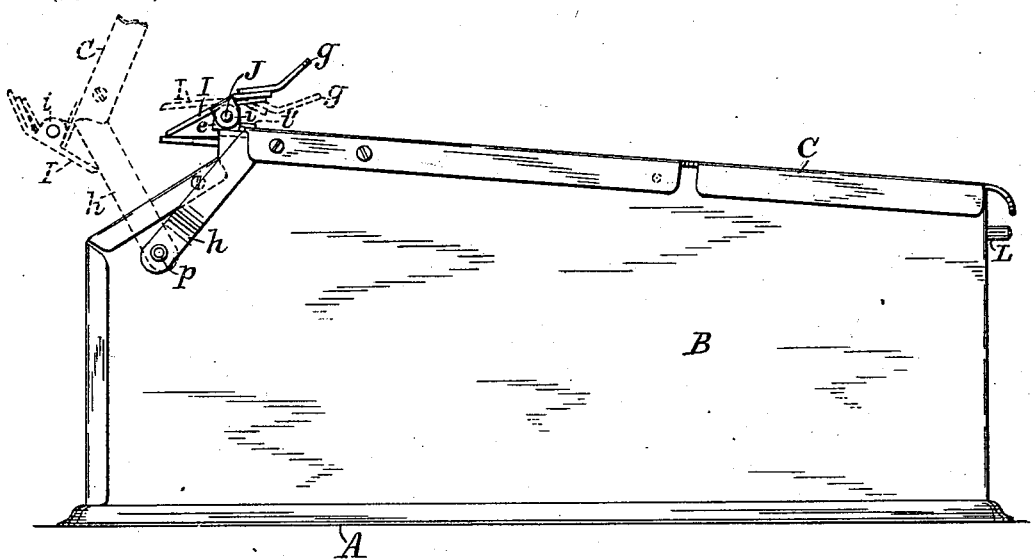

No. 673,724. Patented May 7, 1901.
T. McDOWELL, J. BENGOUGH & K. L. COMES.
MANIFOLDING REGISTER.
(Application filed Nov. 10, 1900.)
(No Model.) 3 Sheets—Sheet 1.

Witnesses.
A. E. Hopkins
L. P. Pearsall

Inventors.
Thomas McDowell,
James Bengough,
Keros L. Comes.
By Mark W. Dewey
their Attorney.

No. 673,724. Patented May 7, 1901.
T. McDOWELL, J. BENGOUGH & K. L. COMES.
MANIFOLDING REGISTER.
(Application filed Nov. 10, 1900.)

(No Model.) 3 Sheets—Sheet 2.

Witnesses.
A. E. Hopkins.
L. P. Pearsall.

Inventors.
Thomas McDowell,
James Bengough,
Keros L. Comes.
By Mark W. Dewey
their Attorney.

THE NORRIS PETERS CO., PHOTO-LITHO., WASHINGTON, D. C.

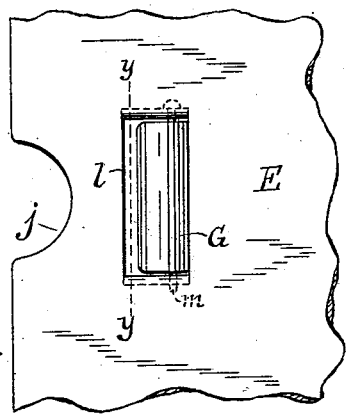
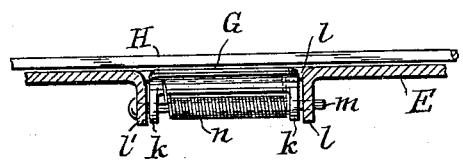
Fig. 5.  Fig. 6.
Fig. 7.
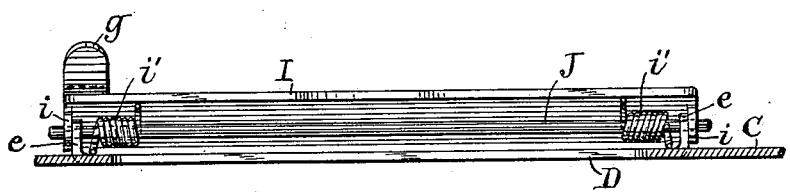
Fig. 8.
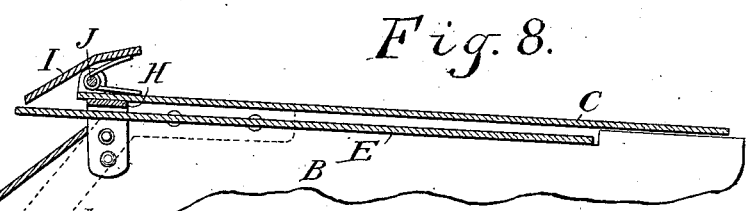
Fig. 9.

UNITED STATES PATENT OFFICE.

THOMAS McDOWELL AND JAMES BENGOUGH, OF NIAGARA FALLS, NEW YORK, AND KEROS L. COMES, OF DANBURY, CONNECTICUT, ASSIGNORS TO THE CARTER-CRUME COMPANY, LIMITED, OF NIAGARA FALLS, NEW YORK.

MANIFOLDING-REGISTER.

SPECIFICATION forming part of Letters Patent No. 673,724, dated May 7, 1901.

Application filed November 10, 1900. Serial No. 36,146. (No model.)

*To all whom it may concern:*

Be it known that we, THOMAS McDOWELL and JAMES BENGOUGH, of Niagara Falls, county of Niagara, and State of New York, and KEROS L. COMES, of Danbury, in the county of Fairfield and State of Connecticut, have invented new and useful Improvements in Manifolding-Registers, of which the following, taken in connection with the accompanying drawings, is a full, clear, and exact description.

Our invention relates to machines for making duplicate copies of writings, whether of sales-slips for use in stores or business memoranda of various kinds, such as bills of lading and the like, and where all of the slips, both original and duplicate, are intended to be drawn from the machine for such purposes as may be required, but is more particularly adapted for bills of lading.

Our invention relates to that general class of manifolding-machines in which the several strips of paper are stored away in any suitable manner or mounted on separate rolls in a suitable compartment and fed over a writing-tablet where sheets of carbon-paper or other manifolding material are interposed between the sheets and a number of impressions made from one writing, the strips being then fed from the tablet and the written portions of the strips all severed or cut simultaneously from the strips. As it is customary to print on both the original and duplicates various headings and space-lines, it is very important in feeding the paper strips from the writing-tablet that the strips should register exactly through their entire length.

Our invention provides for and maintains the perfect registering and alinement of the strips.

Usually with machines of this class it has been the custom to feed or draw off the strips of paper by means of feeding-rolls, spurred or smooth. By the use of this means of feeding the paper one or more of the strips are sure to slip and perfect continuous registration is impossible. This difficulty is overcome in our invention, though dispensing with the feeding-rolls, by a very simple arrangement and means.

Our invention also provides means for accurately severing or cutting the written portions of the strips from the balance of the strips and for clamping the strips while the cutting-bar is raised and while the strips are being drawn off from the tablet.

Our invention will be applicable to any machine in which it is proposed to feed two or more strips of paper in alinement and then sever portions simultaneously from the strips.

Figure 2:
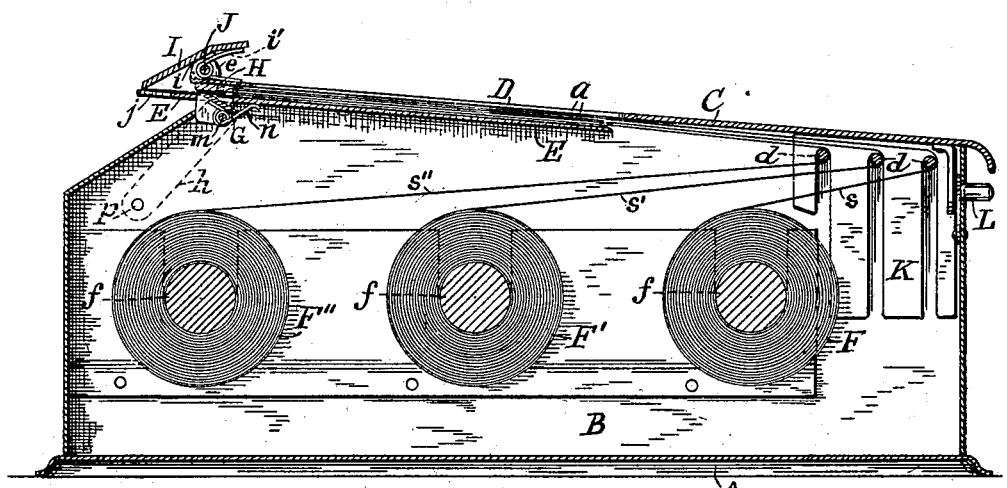
Figure 3:
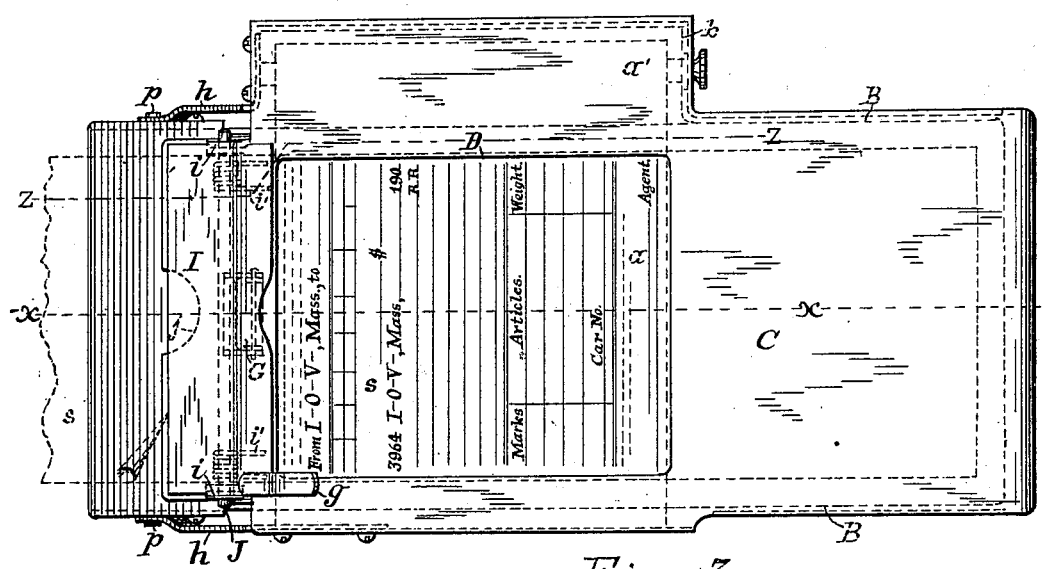
Figure 4:
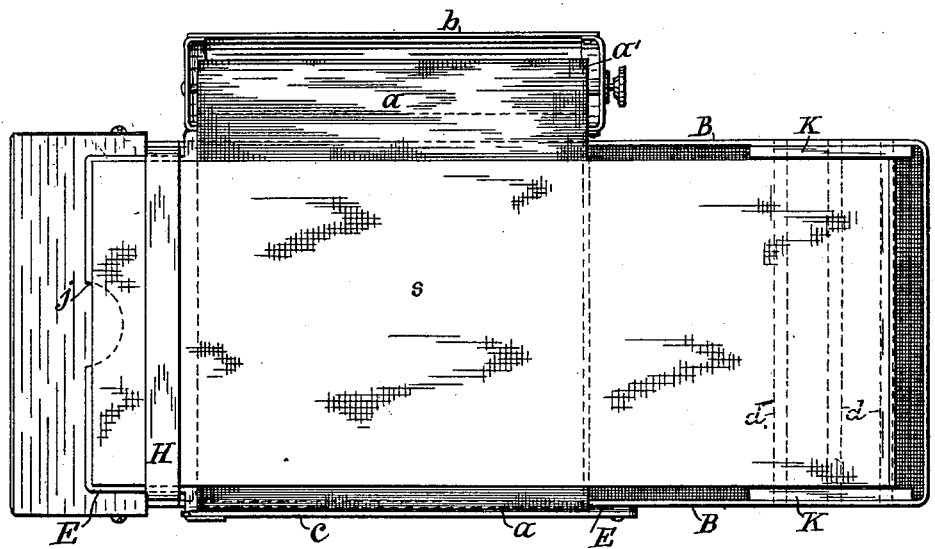

In the drawings hereto annexed and forming a part of our invention, Figure 1 is a side elevation of our improved duplicating-machine and showing a fragment of the cover in broken lines raised from its normal position on the top of the machine. Fig. 2 is a central vertical and longitudinal sectional view of the machine, taken on line $x\,x$ of Fig. 3. Fig. 3 is a top plan view showing in broken lines the strips drawn out and partially severed by the cutting edge. Fig. 4 is a top plan view of the machine with the cover entirely removed. Fig. 5 is an enlarged top plan view of a fragment of the writing-tablet plate, showing the tension device which coacts with a stationary bar above to retain the paper strips in position when the cutter is raised for the purpose of grasping the ends of the strips by the hand and withdrawing them from the tablet after they have been written upon. Fig. 6 is a sectional view of the tablet-plate, taken on line $y\,y$ of Fig. 5, and an elevation of the bar above. Fig. 7 is a central vertical longitudinal sectional view of the tablet-plate, showing portions of the paper strips with carbon-sheets in position between them and the strips lying between the parts of the tension device. Fig. 8 is an enlarged rear side elevation of the cutting device in connection with a cross-section of the cover; and Fig. 9 is a vertical longitudinal sectional view of the tablet and a fragment of the case supporting it, showing how the tablet is removably secured in place, said view being taken on line z z of Fig. 3.

Referring specifically to the drawings, A is the bottom, B the sides, and C the cover or top of the rectangular casing for the working parts of the register. The top C is provided with flanged side edge and the usual opening D, underneath which is removably secured in place upon the sides B the writing-tablet E, supplied with manifolding or carbon-paper, and over which tablet the duplicate strips of paper are passed with the carbon-paper between them in the usual way. The carbon-paper a is mounted preferably upon a roll a', which is contained in a pocket b, formed by or secured upon one side of the writing-tablet plate, and passes across the plate from the roll between the paper strips and at right angles to them and has its ends secured between a turned-over side of the plate and a bar c pivoted to said turned-over side.

F, F', and F'' are the rolls bearing the paper strips, each of which is independently journaled in bearings f f f. (Shown in Fig. 2 in broken lines.) The paper strips pass to the right around the guide-rods d d d and over the writing-tablet between the tension device G in the plate and the bar H above, thence between the end of the tablet-plate E and the cutting-bar I above it. The paper strips are severed from their respective rolls by the cutting-bar I, pivoted to the cover C and under spring tension, bearing with its cutting edge upon the top side of the tablet in proximity to its left-hand edge. The cover is provided with projecting ears e e, which extend upward between downward-projecting ears i i on the ends of the cutting-bar. A rod J passes horizontally across the cover and through the said ears, and coiled springs i' i' on opposite ends of the rod between the ears have their ends extended to engage the cover and the bar I to force the cutting edge downward upon the plate E.

g is an arm on one end of the cutting-bar, by means of which the cutting edge of the bar is raised against the action of the spring to permit the ends of the strips to be grasped and drawn out from the tablet. A recess j in the edge of the tablet-plate allows the ends of the strips to be grasped between the fingers of the hand easily. After the strips are sufficiently drawn out the cutter is released to bear upon the strips and tablet, and the strips are torn off along the cutting edge, as indicated in Fig. 3 of the drawings, or, as a sheet of paper is usually severed, by tearing it along a straight edge.

In Fig. 1 broken lines indicate the position of the cutting-bar I when the arm g is depressed and the forward or cutting edge is raised.

Each roll F, F', and F'' is retained centrally between the sides B B of the case and held under tension by any suitable and well-known means. The strips are held centrally and kept in alinement where they pass around the guide-rods d d d by blocks K, provided with recesses in their lower sides to receive the guide-bars and saddle upon them between the edges of the strips and the inner sides of the case. The said guide-blocks K are removable, but may be permanently secured in place, if desired. The cover C is hinged to the sides B B near the rear end of the case by means of arms h, extending diagonally downward from the rear end of the cover upon the outer sides of the case, the ends of the arms being pivoted to the sides by rivets p.

L is a latch or fastening device for the cover at the front end of the case.

To prevent the strips from slipping back or getting out of alinement when the cutting edge of bar I is raised, the tension device G is provided in the plate E. This device consists of a small rectangular plate G, provided with downwardly-extending ears k k at its ends, through which and through downward-extended ears l' l' at the ends of a slot l in the tablet-plate E extends horizontally a pin m, on which the plate G is pivoted. The plate G has its rear end or edge extending upwardly through the slot l in engagement with the lower side of the strips, said end or edge being chamfered and smooth. A coiled spring n is mounted upon the pin m, having its ends in engagement with the parts to force the chamfered edge upward and press the strips against the stationary bar H, secured at its ends by rivets to the sides B B of the case.

The strip s from the roll F is the upper strip as it passes over the tablet and is usually lined, as well as printed with other matter, to receive the writing, as shown in Fig. 3 of the drawings, and is termed the "Original." The other strips, s' and s'', forming the copies by means of the carbon-sheets, though printed the same as the original, are marked "Duplicate" and "Triplicate," and so on.

With this machine the strips are held perfectly straight and smooth to receive the writing through the opening D in the cover without the liability of shifting or getting out of register, and all parts of the sheets are covered or shielded from contact except the portion exposed through the aperture until the ends bearing the writing are drawn out from the tablet and from between the bar I and plate E for separation, when of course a new set of original and copies are in position on the tablet-plate.

When the cover C is raised and thrown back, as indicated in broken lines in Fig. 1, tablet-plate E may be easily removed from its resting-place upon the sides B B by raising the front end slightly and drawing it forward from below the bar H, which allows the easy insertion of a new set of rolls when desired. Fig. 7 shows clearly how the carbon-sheets $a$ $a$ or strips pass between the paper strips $s$, $s'$, and $s''$, and this will be understood without further explanation.

Having described our invention, what we claim as new, and desire to secure by Letters Patent, is—

1. In a manifolding-register in which a plurality of strips of paper are employed, the combination with the writing-tablet over which the paper strips are passed and manifolding material between the strips, of a tension device mounted upon the lower side of the writing-tablet near its rear end and projecting upward through a slot in the tablet and pressing upon the strips, and means to hold the strips down, as and for the purpose described 2. In a manifolding-register in which a plurality of strips of paper are employed, the combination with the writing-tablet over which the paper strips are passed, and manifolding material between the strips, of a stationary bar extending transversely across the said tablet near its rear end, and a tension device mounted upon the lower side of the said tablet and projecting upward through a slot in the said tablet below the said stationary bar, said strips passing below the said bar, substantially as described and shown.

3. In a manifolding-register in which a plurality of strips of paper are employed, the combination with the writing-tablet over which the paper strips are passed and manifolding material between the strips, of a stationary bar extending transversely across the said tablet near its rear end, said tablet having a slot therein directly below the said bar, a plate extending diagonally upward through the slot and provided with ears on opposite ends pivoted between downwardly-extending ears of the tablet at opposite ends of the slot, and a spring to press the said pivoted plate upward, as and for the purpose described.

4. In a manifolding-register in which a plurality of strips of paper are employed, the combination with the writing-tablet over which the paper strips are passed, and manifolding material between the strips, of a stationary bar extending transversely across the said tablet near its rear end, a tension device mounted upon the lower side of the said tablet and projecting upward through a slot in the said tablet below the said stationary bar, said strips passing below the said bar, and a pivoted bar having a cutting edge bearing upon the upper side of the tablet, substantially as described and shown.

5. In a register for duplicating writings, provided with a plurality of paper strips mounted in rolls, a writing-tablet to support the said strips and carbon-sheets, a pivoted cover for the register provided with an opening to expose a portion of the upper strip of paper, a pivoted plate mounted on the rear end of the said cover and having one edge extending downward and rearward to the top surface of the writing-tablet, and a spring or springs to press the strips of paper between the said edge and the writing-tablet, substantially as shown and described.

6. In a register for duplicating writings, provided with a plurality of paper strips mounted in rolls, carbon-sheets, a removable writing-tablet recessed in its rear edge to support the said strips and carbon-sheets, a pivoted cover for the register provided with an opening to expose a portion of the upper strip of paper, a pivoted plate mounted on the rear end of the said cover and having one edge extending downward and rearward to the top surface of the writing-tablet, and a spring or springs to press the strips of paper between the said edge and the writing-tablet, substantially as shown and described.

7. In a register for duplicating writings, provided with a plurality of paper strips mounted in rolls, carbon-sheets, a writing-tablet recessed in its rear edge to support the said strips and carbon-sheets, a pivoted cover for the register provided with an opening to expose a portion of the upper strip of paper, a plate having ears on opposite ends pivoted to ears extending upward from the rear end of the said cover, said plate extending diagonally downward and rearward to the top surface of the writing-tablet and provided with a chamfered edge for the purpose of severing the strips, a spring or springs on the rod forming the pivot to force the chamfered edge downward upon the paper strips, and a projecting arm on the pivoted plate for tilting the same, as and for the purpose described.

8. In a register for duplicating writings, provided with a plurality of paper strips mounted in rolls, a removable writing-tablet, a pivoted cover provided with an aperture through which the writing is made upon the upper paper strip, means within the case to support the rolls, the guide-rods near the front of the case for the strips to pass over before passing to the tablet and removable grooved blocks saddled on the said guide-rods between the edges of the strips and the sides of the case, as and for the purpose set forth.

9. In a manifolding-register in which a plurality of strips of paper are employed, the combination with the recessed writing-tablet over which the paper strips pass and manifolding material between the strips, of a stationary bar extending transversely across the said tablet near its rear end, said tablet having a slot therein directly below the said bar, a plate extending diagonally upward through the slot and provided with ears on opposite ends pivoted between downwardly-extending ears of the tablet at opposite ends of the slot, a spring to press the said pivoted plate upward, a pivoted cover for the register provided with an opening to expose a portion of the upper strip of paper, a plate having ears on opposite ends pivoted to ears extending upward from the rear end of the cover, said plate extending diagonally downward and rearward to the top surface of the writing-tablet and provided with a chamfered edge for the purpose of severing the strips, a spring or springs on the rod forming the pivot passing through the ears, to force the chamfered edge downward upon the paper strips, and means on the said pivoted plate for tilting the same, substantially as shown and for the purpose described.

In testimony whereof we have hereunto signed our names.

THOMAS McDOWELL. [L. S.]
  JAMES BENGOUGH. [L. S.]
  KEROS L. COMES. [L. S.]

Witnesses to the signatures of Thomas McDowell and James Bengough:
 WILLIAM R. DURDAN,
 ELLIS FAYETTE OLMSTED.

Witnesses to the signature of Keros L. Comes:
 NORMAN HODGE,
 L. LEGRAND HOPKINS.